E. R. JONES.
AUXILIARY VEHICLE SPRING.
APPLICATION FILED DEC. 17, 1915.

1,201,192.  Patented Oct. 10, 1916.

Witnesses

E. R. Jones, Inventor by C. A. Snow & Co.
Attorneys

UNITED STATES PATENT OFFICE.

EVERETT R. JONES, OF DETROIT, MICHIGAN, ASSIGNOR OF ONE-THIRD TO WILLIAM T. MELDRUM AND ONE-THIRD TO AAGE ANDERSON, BOTH OF DETROIT, MICHIGAN.

AUXILIARY VEHICLE-SPRING.

1,201,192.   Specification of Letters Patent.   Patented Oct. 10, 1916.

Application filed December 17, 1915. Serial No. 67,434.

*To all whom it may concern:*

Be it known that I, EVERETT R. JONES, a citizen of the United States, residing at Detroit, in the county of Wayne and State of Michigan, have invented a new and useful Auxiliary Vehicle-Spring, of which the following is a specification.

The present invention appertains to vehicle springs, and aims to provide auxiliary springs adapted especially for use upon Ford or other automobiles wherein the main springs are disposed transversely of the vehicle and longitudinally over the axles, the auxiliary springs being employed for connecting the ends of the main springs to the axles, whereby the springs will have more life and resiliency.

The present auxiliary springs work in conjunction with the main springs so that the shocks will be absorbed, and to eliminate the upward jumping of the body due to the rebound of the main springs.

It is also within the scope of the invention to provide auxiliary springs of the nature indicated which are comparatively simple and inexpensive in construction and manufacture, which can be readily installed upon Ford and other automobiles, and which will serve their office in a thoroughly practical and efficient manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1:
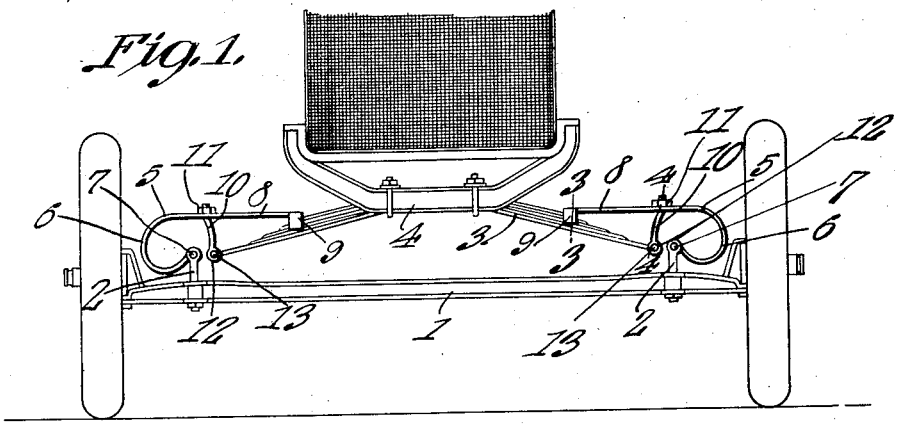
Figure 2:
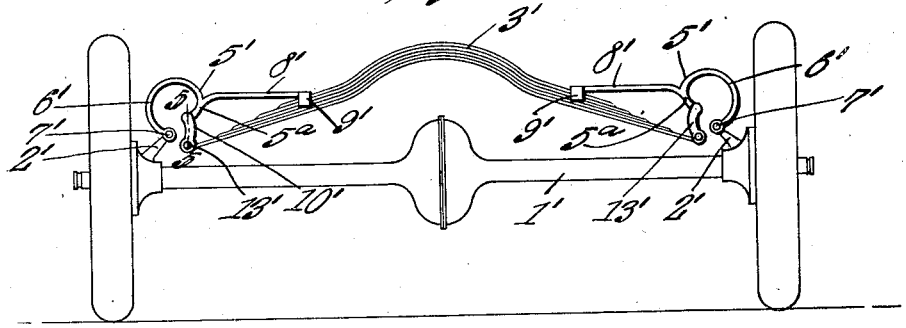
Figure 3:
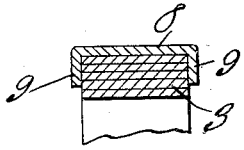
Figure 4:
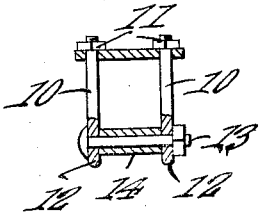
Figure 5:
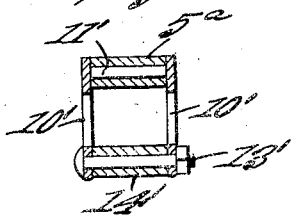

Figure 1 is a front view of the front axle and main spring illustrating the auxiliary springs applied thereto. Fig. 2 is an elevation of the rear spring and axle having the auxiliary springs applied thereto. Figs. 3 and 4 are enlarged sectional details taken on the lines 3—3 and 4—4, respectively, of Fig. 1. Fig. 5 is an enlarged sectional detail taken on the line 5—5 of Fig. 2.

The auxiliary springs are illustrated as being applied to a Ford automobile, although it is to be understood that the auxiliary springs can be used upon other machines where the auxiliary springs could be appropriately applied. The auxiliary springs of the front and rear main springs are of slightly different formations but have the same general characteristics.

In Fig. 1, there is illustrated a front axle 1 having the posts 2 to which the ends of the semi-elliptical or bowed springs 3 are normally pivoted, the front end of the frame 4 being secured upon the intermediate portion of the spring 3.

In carrying out the invention, the main spring 3 is detached from the posts 2, and the main spring is connected to said posts by means of the auxiliary springs 5. The auxiliary springs 5, which are in the form of leaf springs constructed of any suitable resilient material, have the outer curved portions 6 terminally pivoted to the posts 2, as at 7, and the springs 5 are provided with inwardly projecting relatively straight portions 8 extending from the portions 6 toward one another and having their terminals resting upon the main spring 3 between the ends and intermediate portion of said main spring. The inner terminals of the portions 8 have downturned ears 9 straddling the main spring 3, whereby the inner ends of the auxiliary springs are held in place relative to the main spring, so that the portions 8 will not slip off of the main spring forwardly or rearwardly.

The ends of the main spring 3 are connected with the auxiliary springs between the ends of the said auxiliary springs, and to this end, a pair of links 10 which have their upper ends engaged through a pair of apertures provided in the portion 8 of each auxiliary spring 5 between the ends of said spring, nuts 11 being threaded upon the upper end of the links 10 and seating upon the auxiliary spring to attach the links thereto. The lower ends of the links 10 of each pair have eyes 12 through which a pivot bolt or element 13 is engaged, and the terminal eye 14 of the spring 3 engages the bolt 13 between the eyes 12. The terminals of the main spring are thus linked to the auxiliary springs between the ends of said auxiliary springs, with the curved portions 6 of the auxiliary springs projecting outwardly beyond the posts 2. The auxiliary springs thus support the terminals of the main spring, and the main spring can bend downwardly toward a straight line in the same manner as it can ordinarily, and furthermore, the resiliency of the auxiliary springs is added. Thus, when the body is depressed, to force the main spring downwardly, the main spring is not only flexed, but the curved portion 6 of the auxiliary springs are also bent, said parts returning to normal position for restoring the position of the body. The jolting or jumping of the body is prevented, however, due to the rebound of the main spring, since when the main spring is carried upwardly with the body, the auxiliary springs tend to resist the upward movement of the main spring, to prevent the jumping or jolting of the body. It is evident that when the main spring is moved upwardly, the portions 8 of the auxiliary springs will be raised, and this will tend to straighten out or unbend the curved portions 6 of the auxiliary springs, which will resist the upward movement of the main spring and body. Consequently, the auxiliary springs provide for the easy motion of the body, the shocks being absorbed, and the auxiliary springs providing additional resiliency. The links 10 are preferably curved so as to avoid striking the posts 2, and the ends of the main spring can work relatively to the posts 2 without contacting with the axle. The same action takes place at the rear of the machine, when the auxiliary springs are applied to the rear main spring and rear axle, as illustrated in Fig. 2. The auxiliary springs in this case are of slightly modified form.

1' designates the rear axle having the posts 2' to which the ends of the semi-elliptical or bowed main spring 3' are ordinarily pivoted. In the present case, the ends of the spring 3' are detached from the posts 2', and the main spring 3' is connected to the posts 2' by means of the auxiliary springs 5' having remote curved portions 6' pivoted to the posts 2' as at 7', and having inwardly projecting approximately straight portions 8' resting at their ends upon the spring 3' and having depending ears 9' straddling the spring 3' to hold the auxiliary and main springs in place relative to one another. The springs 5' are provided between the portions 6' and 8' with downwardly projecting portions 5ª which are linked to the ends of the main spring 3', the links 10' being arranged in pairs, and each pair of links 10' having their upper ends connected by a cross pin 11' pivotally engaged through the respective portion 5ª. Bolts 13' are engaged through the lower ends of the links 10' and the terminal eyes 14' of the main spring 3' which are disposed between the links 10'. The action of the auxiliary springs 5' is practically the same as the action of the springs 5 above described.

Having thus described the invention, what is claimed as new is:

An auxiliary leaf spring having a straight portion provided with means at its end to bear upon and straddle a bowed spring and having a downwardly curved portion to pivotally engage a post, and a link for connection with the end of said bowed spring engaged to the auxiliary spring between the ends thereof.

In testimony that I claim the foregoing as my own, I have hereto affixed my signature in the presence of two witnesses.

EVERETT R. JONES.

Witnesses:
 LEO F. TIMMA,
 W. W. HILL.

Copies of this patent may be obtained for five cents each, by addressing the "Commissioner of Patents, Washington, D. C."